Figure 1:
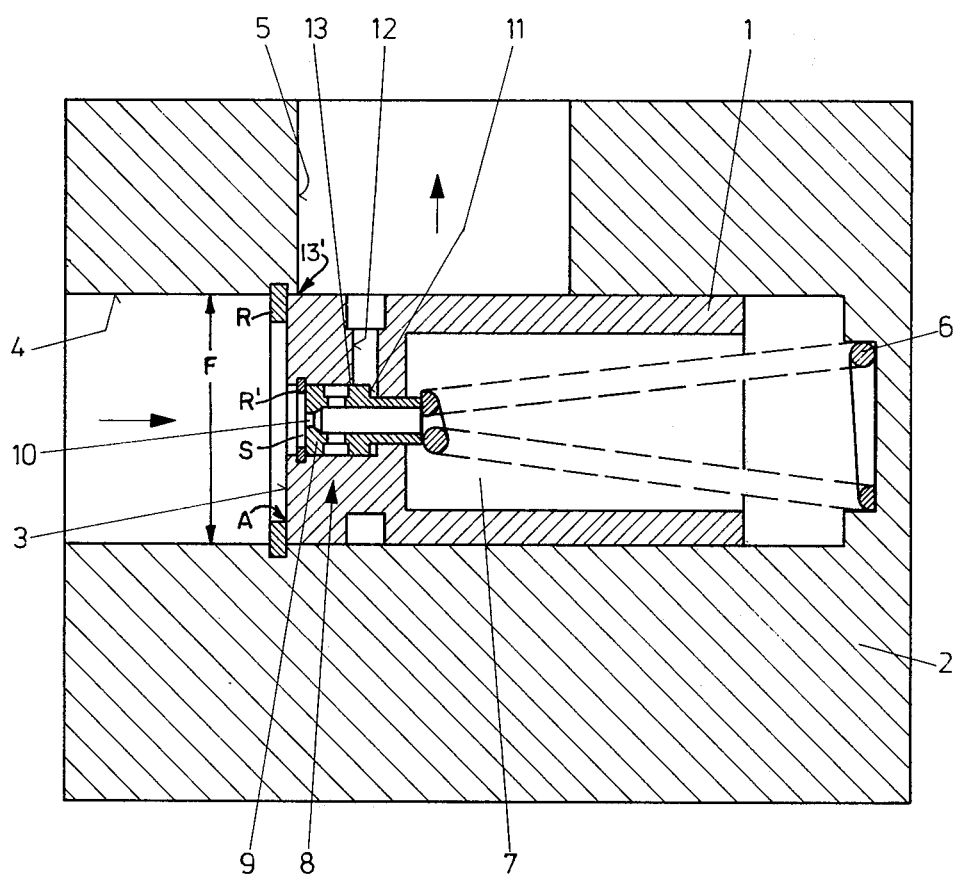

United States Patent [19]

Lang

[11] 3,952,771
[45] Apr. 27, 1976

[54] RELIEF VALVES WITH PILOT VALVES

[75] Inventor: Armin Lang, Schwabisch Gmund-Bettringen, Germany

[73] Assignee: Zahnradfabrik Friedrichshafen AG, Friedrichshafen, Germany

[22] Filed: May 29, 1975

[21] Appl. No.: 581,978

[30] Foreign Application Priority Data
Jan. 8, 1975 Germany............................ 2500537
Jan. 8, 1975 Germany............................ 2300480

[52] U.S. Cl. ............................................... 137/491
[51] Int. Cl.² ..................................... F16K 31/383
[58] Field of Search................ 137/491, 490, 612.1, 137/512.5

[56] References Cited
UNITED STATES PATENTS
3,216,443  11/1965  Schmiel ......................... 137/491 X
3,216,446  11/1965  Schmiel ....................... 137/512.5 X

*Primary Examiner*—Henry T. Klinksiek

[57] ABSTRACT

Piston type hydraulically balanced relief valves are disclosed except for one modification, utilizing pilot valves carried completely within the bodies of the relief valves or relief valve cartridges and wherein a single spring serves for closure of the relief valve and the respective pilot valve. All pilot valves are thus biased by a single spring primarily due to differential upstream and downstream areas both exposed to inlet pressure but with the upstream area larger and dominating. Accordingly, a single light biasing spring can suffice because of the reduced net opening force required, upon a predetermined rise in inlet pressure. The constructions afforded by such an arrangement are more compact than conventional pilot controlled relief valves wherein the relief and pilot valves are closed by separate and relatively heavy springs. Further, the advantage of the sensitivity of pilot controlled relief valves is realized together with effective damping and minimum control flow dependency. In all forms of the invention the pilot valve is of differential area construction, having front and rear, i.e., upstream and downstream, surfaces exposed to inlet pressure whereat a reduced net effective pressure force is in the opening direction. This is achieved by the simple expedient of having a front area exposed to inlet pressure in the opening direction but acting against inlet pressure on a somewhat smaller rear area.

24 Claims, 11 Drawing Figures

FIG. 10
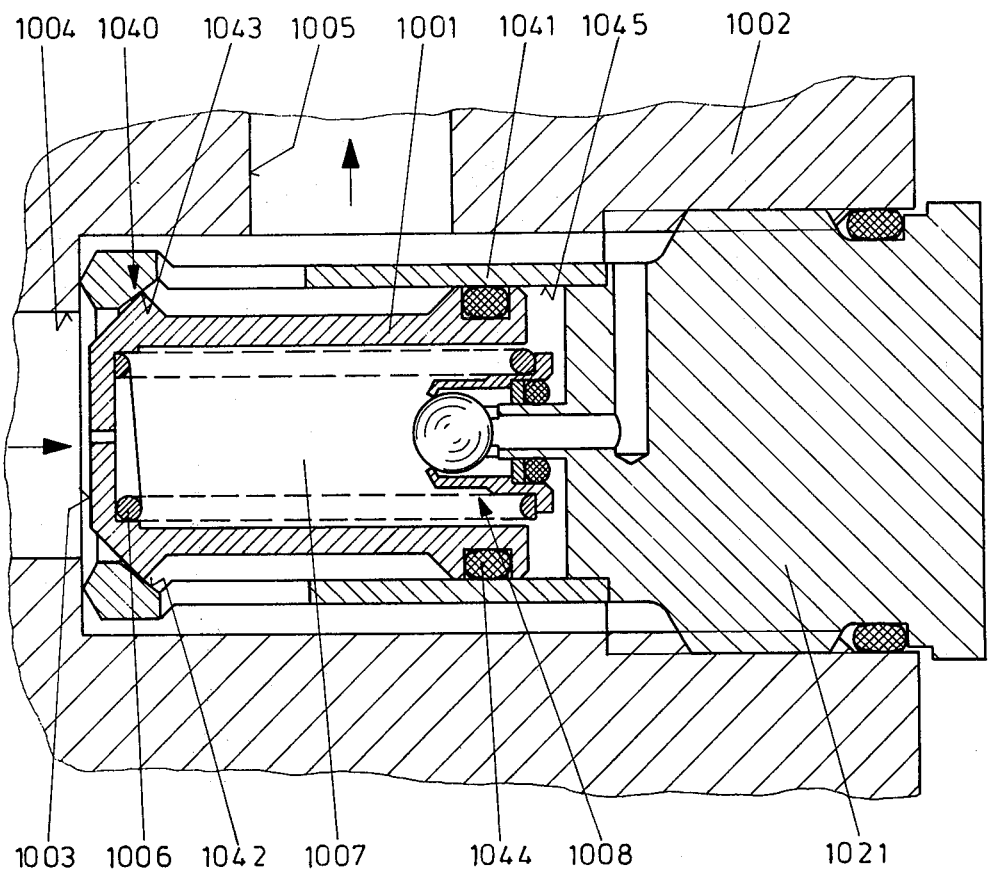
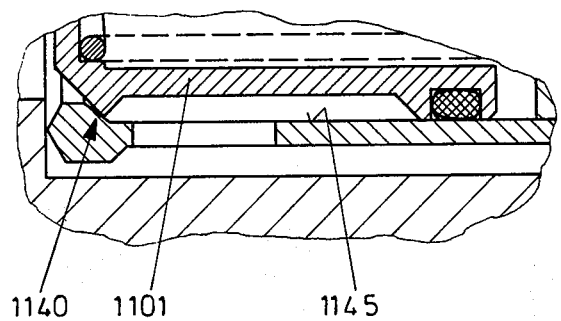
FIG. 11

RELIEF VALVES WITH PILOT VALVES

Pilot controlled relief valves are generally not new and a valve of that type is shown in U.S. Pat. No. 3,439,623, utilized for flow regulation of a pump and illustrating separate springs for the relief and pilot valves. The particular advantage of the various modifications disclosed herein is evident for use in pumps or other hydraulic devices where space is limited.

Other advantages will appear from the description which follows taken in conjunction with the appended drawing in which:

FIGS. 1 – 10 are longitudinal cross sections of all essential components of differing modifications of relief and pilot valve combinations wherein the relief valves are hydraulically balanced after closure; and FIG. 11 is a fragmentary longitudinal section based on the construction of FIG. 10 but wherein the relief valve is acted upon by differential pressure in the closing direction.

In all figures of the drawing components for which reference characters have not been provided and in the description to follow it will be understood that the components shown are the same as those in previous figures.

Referring to FIG. 1, a piston type relief valve 1 is slidably disposed in a housing 2, having an upstream face 3 within the pressure inlet passage 4 and blocking flow to the return passage 5. A compression spring 6, in this instance of conical shape, bears against the downstream end wall of the housing and is located within a chamber 7 downstream of a pilot valve 8. It will be noted that the single spring 6 maintains and causes closure of both the pilot and the relief valves wherein a stop limit ring R, as shown, is abutted by the relief valve and another stop limit ring R', as shown, is abutted by the pilot valve. Chamber 7 thus serves as a pressure and spring chamber.

Pilot valve 8 comprises differential area piston 9 axially provided with a throttle bore or restricted flow passage 10 and a downstream surface radial area 11 exposed to outlet pressure of zero or insignificant degree in the radial bore 12 effected as a valve port in a wall of relief valve 1 and connecting with return or outlet passage 5. The area 11 represents the net equivalent area on which inlet pressure acts to open the pilot valve since it represents the difference between the front and rear areas, i.e., upstream and downstream areas, respectively, of the pilot valve. The piston valve body of the pilot valve is provided with a flow cutoff edge 13 and radial and annular passages as shown so that, as will be evident, when the pilot valve is forced by pressure to the right, flow will take place from the inlet 4 to the outlet 5. This reduces the pressure in chamber 7 whereat pressure on the upstream face of relief valve 1 will cause that valve to move to the right opening a gap at 13' whence pressure is relieved from inlet to outlet.

For purposes of clear definition in describing the pilot valve surfaces, the surface S is considered a front or upstream surface or area against which inlet pressure acts to cause opening of both valves against spring 6 upon a predetermined rise in inlet pressure acting against surface S. All other surfaces, except for marginal area 11, are exposed to inlet pressure in chamber 7, but even additively they are of less area than area S which encompasses the full diameter of piston 9 since inlet pressure has access between ring R' and the front surface of the piston, due to normal manufacturing tolerances. Thus, pressure force on the upstream side of piston 9 dominates.

It should be noted that all modifications herein, while differing structurally, are operative in the same manner, it being further noted that any pilot valve surface exposed to outlet pressure in any modification does not affect operation since outlet pressure is normally negligible.

While the differential areas exposed to inlet pressure of the pilot valve are such as to maintain opposed hydraulic forces on the pilot valve after closure by the spring against the limit ring R', this is not true of the relief valve. Thus, pressure is permitted access against the upstream full face radial area (double headed arrow F) of the relief valve balanced by the same pressure on equal area in chamber 7 effected through bore 10. The relief valve is thus a hydraulically balanced valve.

Figure 2:
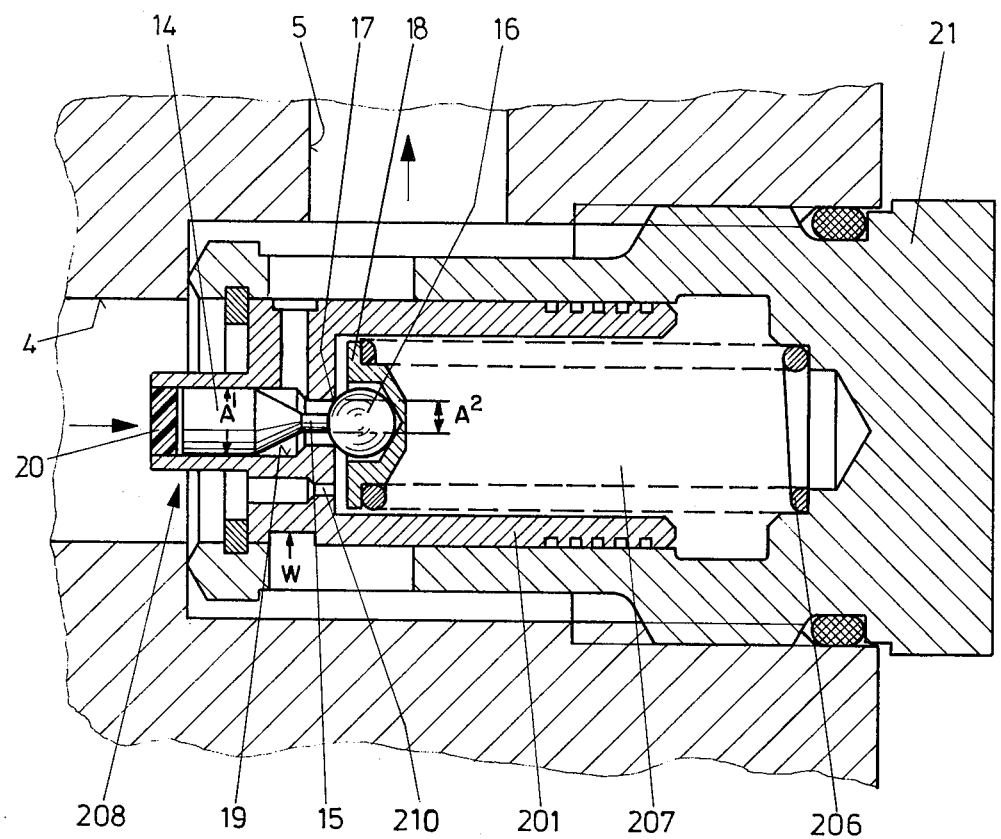

Referring now to FIG. 2, inlet and outlet passages 4 and 5, respectively, are shown, and the pilot valve 208 comprises a valve actuating piston 14 carried in a forwardly extending collar 19 of piston relief valve 201, for operating the pilot valve ball 16. Both valves are in an assembly in a housing bore, being carried in a cartridge 21 threaded into the housing bore, as shown, so that the upstream end of the cartridge abuts and seals against the upstream radial wall of the housing bore surrounding the inlet passage.

The piston 14 has a pin 15 integrally extending rearwardly for abutting the valve ball 16 which is carried in a spring retainer cup 18 and engages the seat 17 machined axially in the radial upstream closure wall W of the relief valve. Cup 18 is biased by compression spring 206 to ball seating position and it will be noted that a sealingly slidable coaction between the hollow cylindral interior of the relief valve and the cartridge 21 affords a chamber 207 under inlet pressure via the restricted bore 210 in the radial wall W which affords the valve seat. Spring 206 at its downstream end is socketed in the cartridge end as shown. The piston 14 at its upstream end engages a flexible disc 20 which seats the bore of collar 19 but is exposed to inlet pressure.

Piston 14 is pressure actuated upon a predetermined rise in inlet pressure by flexible disc 20 which may be of a highly viscous plastic material longitudinally fixed in the bore of collar 19 by virtue of radial pressurizing, or by other expedients, but in any event so that no bodily motion of the disc 20 is needed, but only a flexing or bowing of the disc material to effect movement of piston 14 whereby valve ball 16 is opened. Such opening, of course, causes a pressure drop in chamber 207 whereat pressure on the upstream face of relief valve 201 will effect shifting to the right and opening of a flow path from inlet to outlet.

In the above embodiment the radial area (A') of piston 14 is larger than that of a port effecting valve seat 17 ($A^2$) and therefore corresponds to the larger radial area of a piston type pilot valve, while the radial area of valve seat 17 corresponds to the smaller radial area of a piston type pilot valve. Return passage pressures acting against these same areas are negligible. The spring force acts to effect closing pressure of both the pilot valve and relief valve. Upon predetermined rise in inlet pressure on disc 20 only a very slight movement of the valve ball 16 is required to effect pressure relief and, accordingly, only a slight movement of piston 14 is necessary. Hence, the mere elasticity of the disc 20 is sufficient to effect opening of valve ball 16 and no frictional losses occasioned by sliding parts are experienced. Also, disc 20 serves as a retainer for piston 14 within collar 19.

Under conditions where a rise in pressure in the return passage 5 is greater than inlet pressure might be expected, disc 20 may be backed up in any suitable manner as by a locking ring (not shown). In any event, the construction involving disc 20 and piston 14 permits a much greater tolerance of fits as compared with piston type pilot valves and thereby effects simpler manufacturing and an economy. Further, disc 20 prevents leakage past piston 14 and thus avoids hydraulic blocking, the over-all effect being precise response of the pilot valve 208, as well as elimination of a need for relief grooves in piston 14. Finally, the cartridge insert construction permits use of the entire assembly in various pumps and hydraulic devices, all of which can be provided with the same sized bore and threading for accommodating a cartridge.

Figure 3:
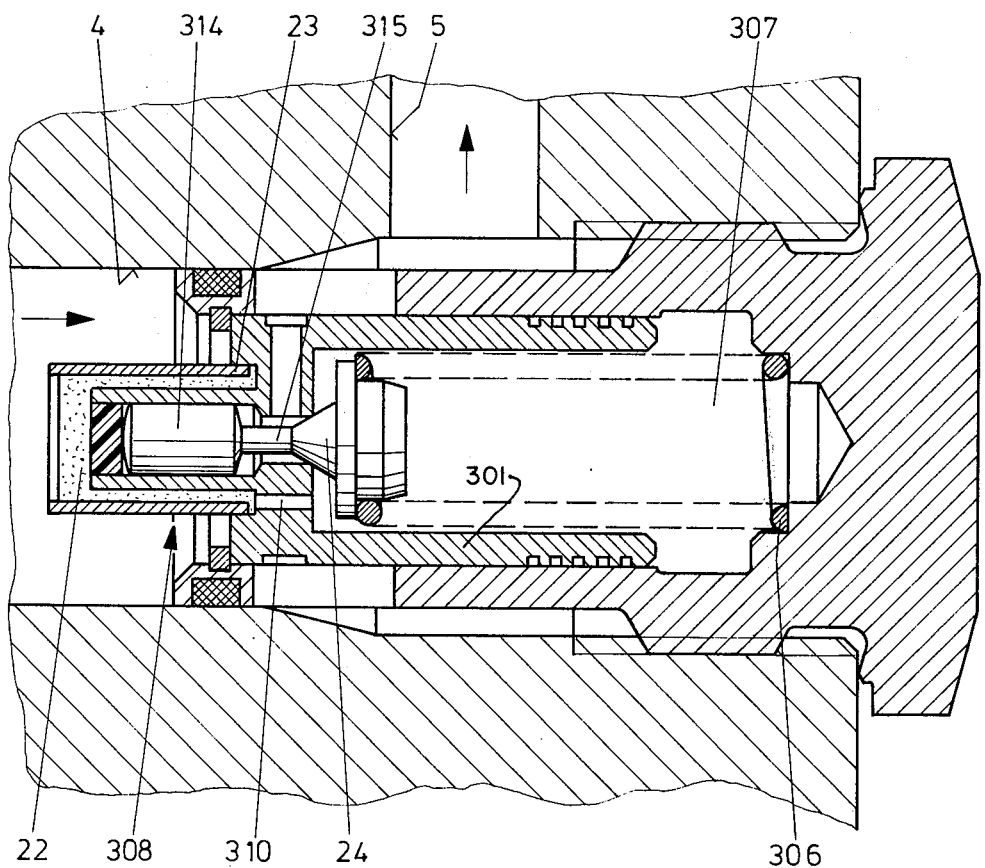

Referring now to FIG. 3, the essential advantage of the form of the invention shown in FIG. 2 is preserved in that only a very small opening of the pilot valve is needed to effect actuation of the relief valve. In that regard, however, the very small opening can trap particles of dirt on the valve seat or valve closing area which could lead to incomplete closure and leakage, having deleterious effects such as insufficient closing pressure acting on the valve piston itself.

Accordingly, in FIG. 3, there is disclosed essentially the same components as in FIG. 2, such as relief valve 301, but for a fine mesh filter 22 carried within a collar 23 concentric with the elements of the pilot valve 308 comprising piston 314, pin 315, and concial valve 24. It will be recognized that the opening action via an abutting elastic disc acting on piston 314 is the same as that heretofore described in connection with FIG. 2. Thus, movement of piston 314 can effect opening of valve 24 against spring 306 in the downstream pressure chamber 307 whereat the relief piston valve is then pressure operated to effect pressure relief. The somewhat stronger pressure differential caused by the closed mesh filter has no operation significance inasmuch as only a very small stream of pressure fluid passes through the restricted bore 310. It should be noted that the use of the conical valve head 24 has some advantage over the use of a valve ball since it is more stable against sidewise or oscillatory movement. Further, for simplification of manufacture, valve 24 and pin 315 may be integral.

Figure 4:
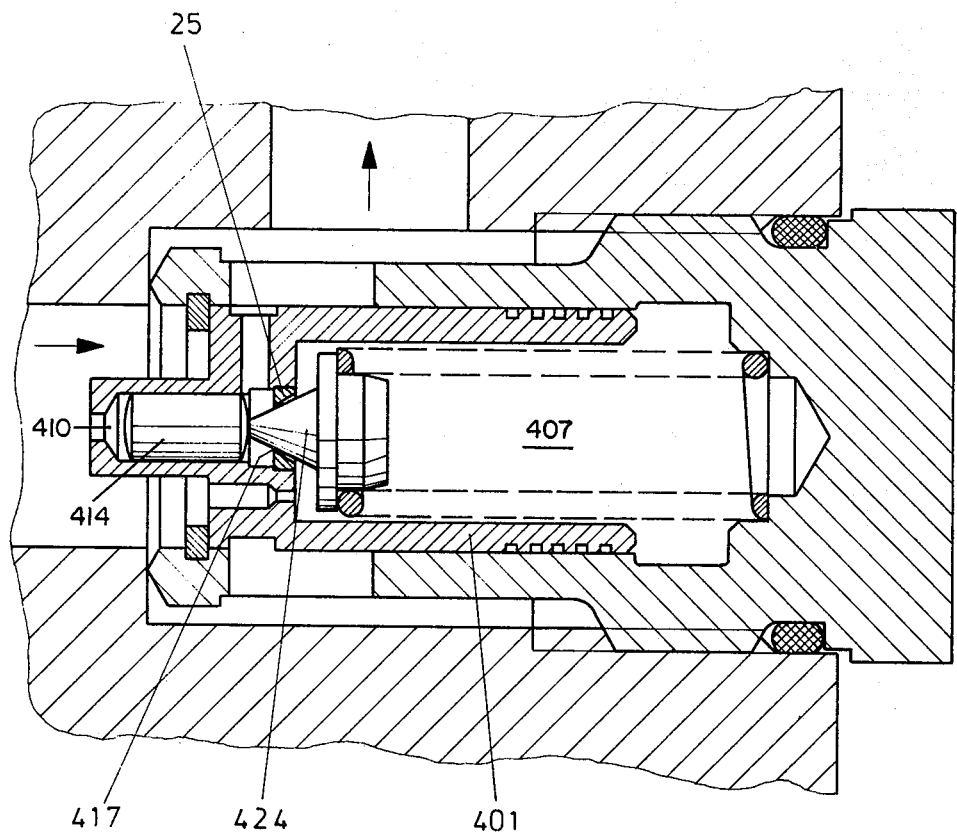

Referring now to FIG. 4, the restricted orifice 410, slidable piston 414, and chamber 407 are present. The essential difference over previously described constructions is that the valve seat 417 for conical valve 424 is effected by a ring 25 inserted in relief valve piston 401. Accordingly, a very precise manufacture of the valve seat is possible. It may also be noted that in this construction a simple sliding piston 414, having an upstream face exposed to inlet pressure directly, may be utilized for opening the pilot cone valve 424.

Figure 5:
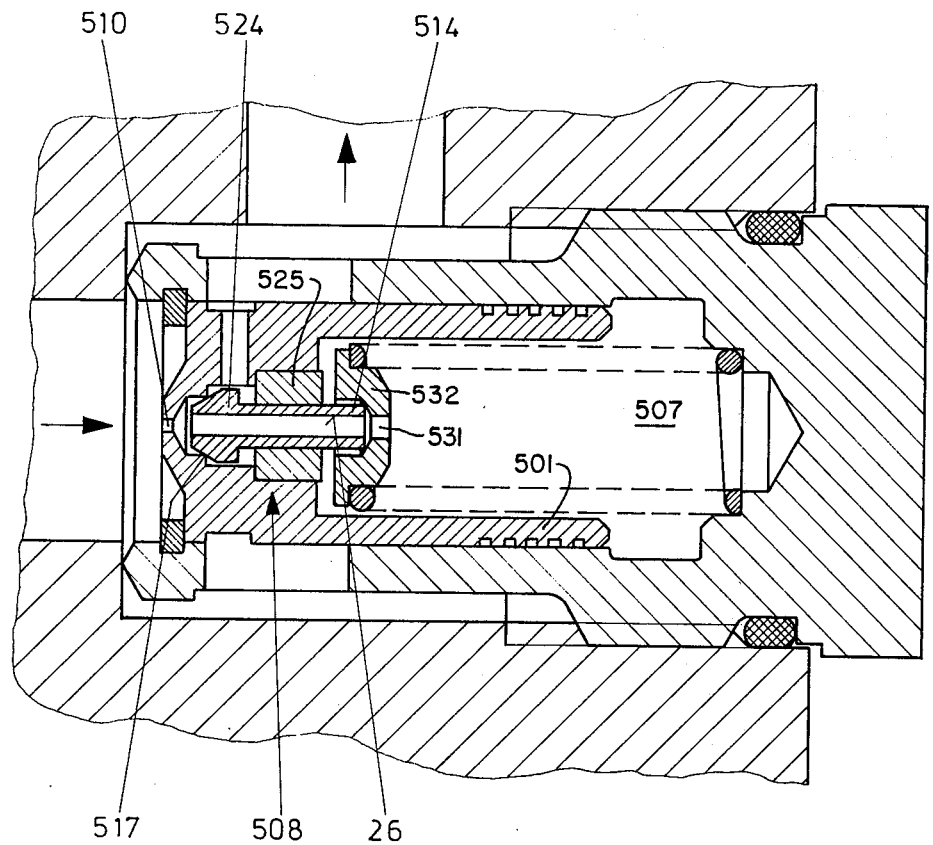

FIG. 5 is an embodiment showing a pilot valve 508 comprising an enlarged conical valve head 524 effecting an area greater than the effective cross sectional area of the integral tubular valve piston or body 514 forming the movable element of the pilot valve. Piston 514 is provided with a guide ring 525 secured in a coaxial bore of a wall of the relief valve 501. A throttle or restricted bore 510 is provided in the upstream end wall of relief valve 501 feeding inlet pressure via bore 26 through the tubular body 514 to the chamber 507 effected by the relief valve and the housing, and a bore 531 in the spring retainer cup 532 as shown. Accordingly, restricted flow passes into the chamber downstream of the pilot valve and the differential area arrangement effects operation of the pilot valve in a manner similar to that effected by the construction shown in FIG. 1.

The particular advantage of the construction shown in FIG. 5 resides in the machined valve seat 517 for the cone of pilot valve 524 in that with subsequent wear an increased safety factor is effected by enlargement of the effective seat cross sectional area as the differential pressure acting on the pilot valve increases.

Figure 6:
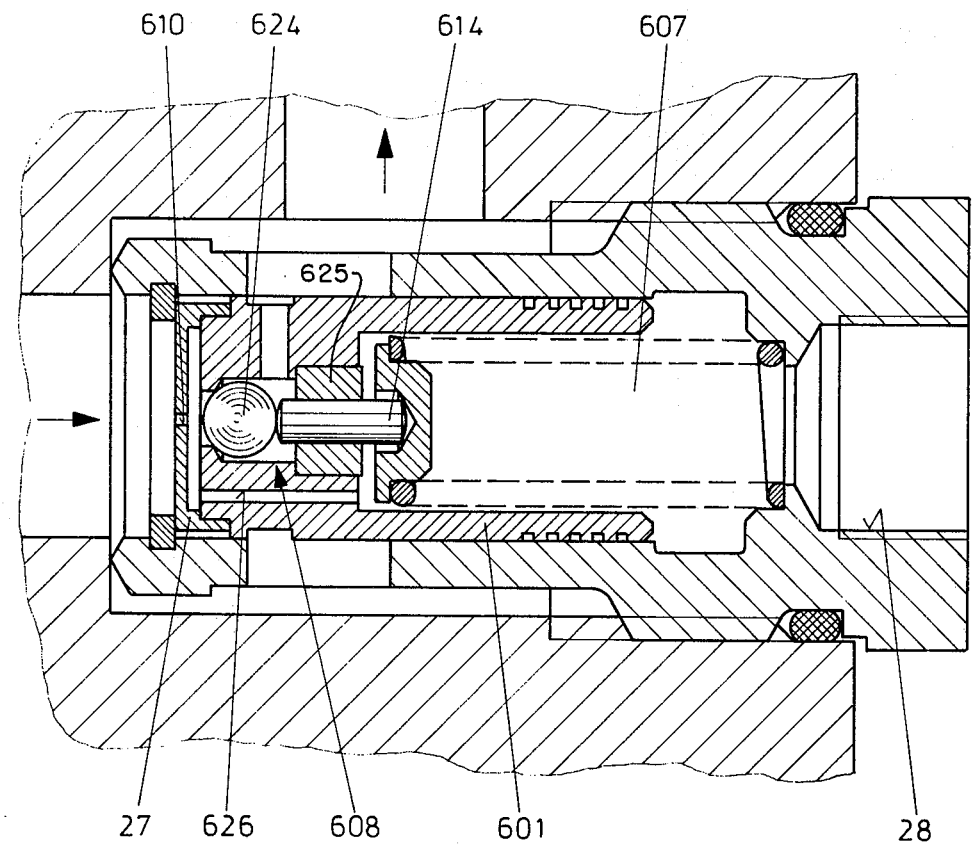

Referring now to FIG. 6, the construction is modified in comparison with FIG. 5 in that the one piece differential pilot valve of FIG. 5 is replaced by the pilot valve 608 having a valve ball 624 actuatable by a pressure operated slidable pin 614 guided in a ring 625 carried coaxially in relief valve 601. The throttle or restricted bore 610 is provided in an upstream closure cap 27 carried by the relief valve.

A passage bore 626 in the relief valve 601 provides for inlet pressure in the chamber 607 and also as a damping bore for the relief valve.

In this instance, the outer end of the cartridge which carries the combination relief and pilot valve assembly may be provided with a threaded passage 28 for connection to any remote source (not shown) of pressure for controlling the characteristics of opening and closing of the relief and pilot valves, or it may be closed by a threaded plug (not shown).

Figure 7:
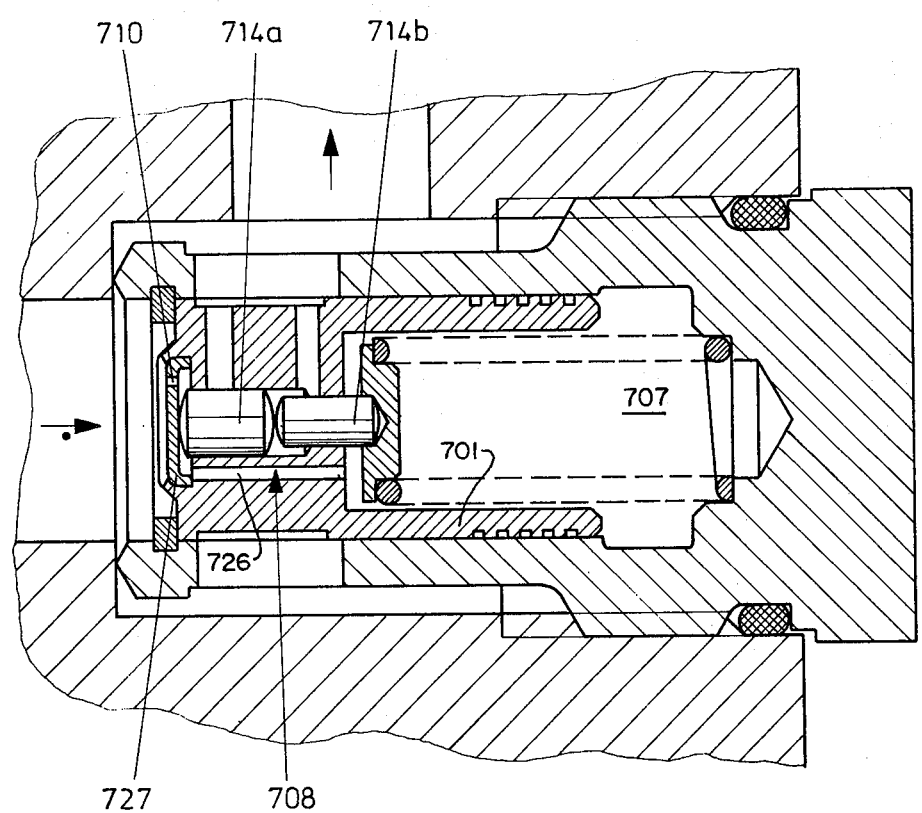

The embodiment shown in FIG. 7 utilizes a pilot valve 708 comprising a pair of abutting 714a and 714b of unequal diameter to effect the differential biasing pressure. A frontal cap 727 carried by the relief valve 701 is provided with a restricted bore 710 whereby inlet pressure will be understood to communicate via passage 726 with the chamber 707.

It will be apparent that inlet pressure acting on the piston 714a will move it to the right against the pressure biasing force action on piston 714b to ultimately permit discharge by uncovering the radial passage blocked by piston 714a. Accordingly, the drop in pressure in the chamber will permit opening of the relief valve.

Figure 8:
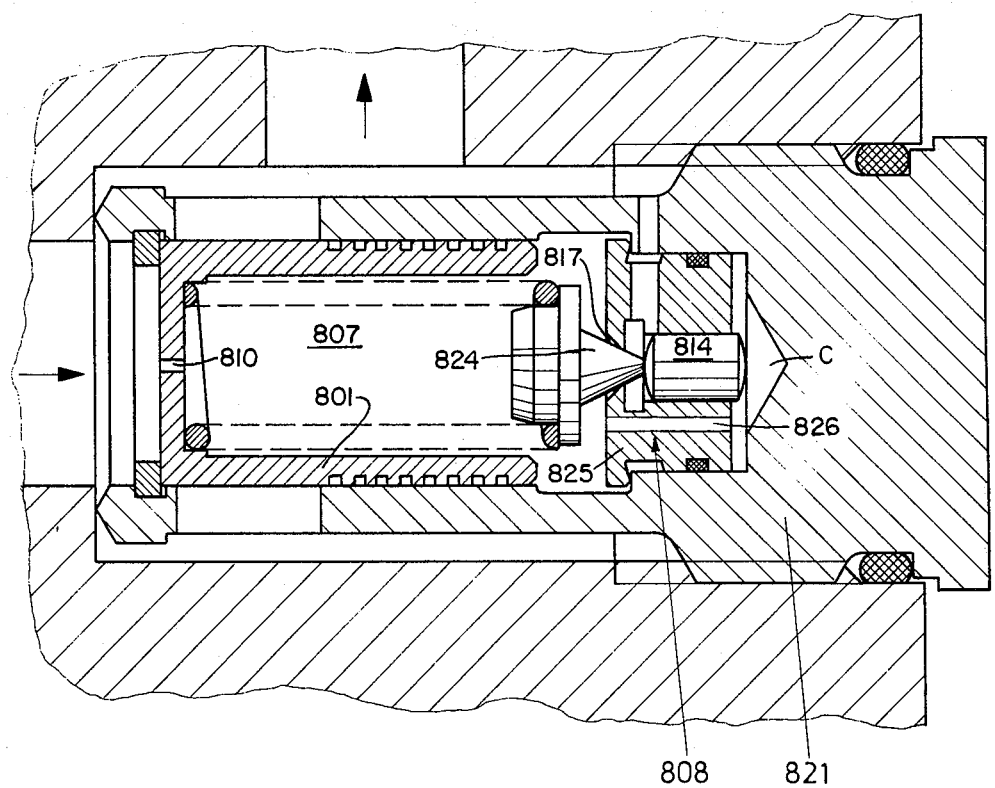

Referring now to FIG. 8, the pilot valve 808 comprises a threaded cartridge 821, as in other modifications, but with the reversal of orientation of the conical pilot valve head 824. The valve head will be seen to have inlet pressure at its upstream side in chamber 807 through restricted bore 810 in the end wall of the relief valve 801 but the working inlet pressure feeds through a bore 826 in a ring 825 sealingly fixed in cartridge 821 to a chamber C to act on a piston 814 slidable in a bore of ring 825 which piston abuts the valve head 824. Piston 814 has its outer face exposed in chamber C which is formed as shown between ring 825 and the end of cartridge 821. The valve head coacts with a seat 817 within ring 825, and which ring is provided with passages as shown whereby opening of the valve head 824 will permit communication from the chamber 807 to the return passage in the housing and thus effect opening of relief valve 801.

It will be apparent that a predetermined increase of pressure in chamber C will result in increase of pressure differential acting on the pilot valve to open that valve, the surface of piston 814 in chamber C being considered a front area of valve head 824 and larger than the net area of that valve exposed to inlet pressure in chamber 807.

Figure 9:
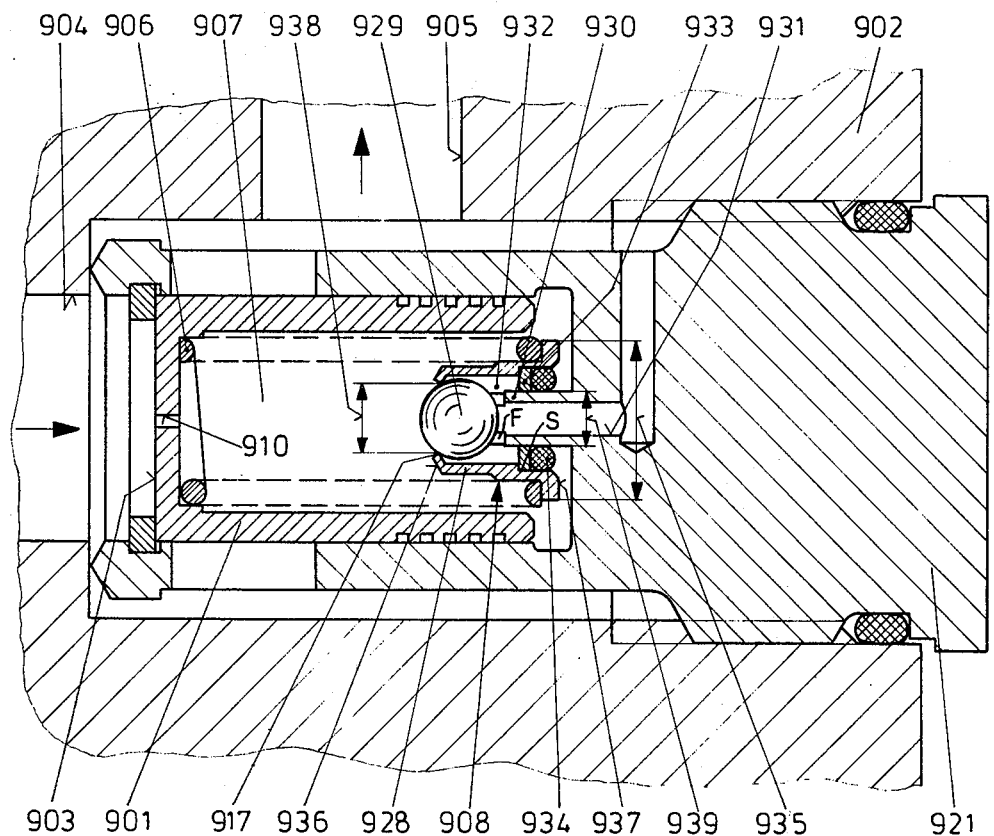

Referring now to FIG. 9, a modified construction is shown which overcomes certain difficulties which may arise in the modifications thus far described wherein the pilot valve operates with very small sizes of valve seats or valve seat bores which may cause manufacturing difficulties.

FIG. 9 shows a relief valve 901 and pilot valve assembly 908 carried in the cartridge 921, threaded as in other modifications in a housing 902. Also, as in other modifications, the relief valve is seated against a stop limit ring at its upstream surface 903, the ring being carried in the upstream end of the cartridge and exposed to pressure in inlet passage 904. The relief valve is biased to closing position as by the compression spring 906 so that upon opening of pilot valve 908, pressure fluid will communicate to return passage 905 from the chamber 907 maintained under inlet pressure through throttle bore 910 and relief valve 901 can then open.

In this instance, a relatively stationary ball valve head 929 is seated against a movable valve seat opening 917 effected by the swaged over lip 936 demarcating a coaxial opening in a spring retainer collar or tubular valve seat member 928 secured to a ring 933 which is slidable on a support collar 930 and provided with the O-ring seal 934 on that collar. Collar 930 connects the interior of the valve seat member with outlet pressure in passage 905. Ring 933 is limited in movement by shoulder S on the collar 930 against movement to the left. The spring 906 has a reaction at the upstream end against the end wall of the relief valve 901 and at the downstream end against the radial end flange 937 of valve seat member 928. The collar 930 is a tubular extension coaxial of and integral with the cartridge, and having integrally at its free end, spaced protruding fingers F, as shown, abutting the ball 929 for axial support.

A concentric spacing 932 is effected between the valve seat member 928, and collar 930, at the end of the collar 930. Return passage 905 has constant communication via passage 931 to spacing 932.

From the above description it will be noted that with the closure of ball 929 against seat opening 917, as shown, effected by spring bias on flange 937, inlet pressure in chamber 907 acts for pressure bias against an effective area to maintain closure which consists substantially of the exterior radial area of lip 936. The pressure force biases the spring retainer cup 928 to the right to maintain the pilot valve closed. Thus, the effective closing pressure acting on lip 936 is on the overall cross sectional area indicated by double headed arrow 935 less the overall flow area through valve seat 917, indicated by double headed arrow 938. This is the smaller area of the differential surface areas.

A separation force acts to move the valve seat member 928 to the left away from ball 929 to open the pilot valve upon predetermined rise of pressure in chamber 907. The effective opening pressure acting to move member 928 to the left is substantially on the exterior radial area of gasket 934. This amounts to the overall cross sectional area indicated by the double headed arrow 935 less the overall cross sectional area of collar 930 indicated by double headed arrow 939 and is the larger area of the differential area surfaces.

The differential effective area arrangement is predetermined to provide ball closure pressure bias which can be overcome by predetermined inlet pressure to open the pilot valve 908 and thus drop the pressure in chamber 907. Relief valve 901 can then overcome the spring bias to vent the chamber via passage 905. As in all other modifications, the relief valve is balanced hydraulically and maintained closed by spring bias. The particular modification uses components which are relatively simple to manufacture and the spring retainer cup 928, spring loaded, renders a stable balance and good sealing.

The modifications shown in FIGS. 10 and 11 differ essentially from the previous modifications in that a conical head valve is used in the relief valve instead of a piston valve. This provides a more certain seal for the relief valve.

Referring particularly to FIG. 10, a pressure operated relief valve 1001 is disclosed axilly slidable within sleeve portion 1041 integral with threaded cartridge portion 1021 within the housing 1002. The relief valve is biased closed as by compression spring 1006 so that sharp edge 1043 seals closely against the conical area 1040 of the valve seat 1042 at the upstream end of the cartridge as shown. Thus, the relief valve end wall 1003 closes inlet passage 1004 but opens that passage upon moving to the right for venting to return passage 1005. The end wall 1003 of the relief valve is provided with a restricted bore, as shown, for effecting inlet pressure in the chamber 1007. A ring seal 1044 is provided at the downstream end of the relief valve in sliding co-action with the interior wall 1045 of the cartridge sleeve portion. Thus, it will be apparent that the concial valve construction which comprises the cylindrical extension 1041 of the cartridge and the conical seat in conjunction with the conical valve head makes up a tighly sealing relief valve arrangement having equal upstream and downstream areas to effect a hydraulically balanced valve.

In this instance, the pilot valve assembly is the same as that described in FIG. 9, as is the operation thereof and therefore need not be repetitiously described.

In general, spring 1006 will maintain closure of the relief valve but where space limitations are such that a sufficiently large spring cannot be used, the modification of FIG. 10 is changed so as to provide pressure unbalance on the relief valve. Thus, in FIG. 11 a hydraulically unbalanced relief valve is fragmentarialy disclosed wherein the valve body 1101 has differential areas which are provided by a conical valve seat 1140 womewhat smaller than the diameter of the internal surface 1145. It will then be apparent that inlet pressure acting inside the chamber will have a total force to the left greater than inlet pressure to the right considering the effective areas upstream and downstream. Accordingly, the relief valve 1101 is pressure biased to closing position and a smaller spring may be utilized.

What is claimed is:

1. A relief valve having pilot valve control comprising:
   a housing having an inlet passage and an outlet passage and a pressure chamber;
   a relief valve intermediate said passages and disposed in said housing so as to be exposed to inlet pressure opening force from said inlet passage and closing pressure force in said pressure chamber;

restricted flow means for providing the inlet pressure of said inlet passage in said pressure chamber;

a pilot valve means comprising means effecting differential area surfaces;

means whereby said surfaces are exposed to inlet passage pressure in opposed directions wherein one surface is larger to effect an opening force when subjected to predetermined inlet pressure to actuate said pilot valve means;

said pilot valve means being thus movable and responsive to predetermined inlet pressure and being connected to vent said pressure chamber so that the reduction in closing pressure force on said relief valve permits opening thereof by inlet passage pressure to relieve pressure in said inlet passage;

a spring in said pressure chamber biasing said pilot valve means to closed position and means whereby said spring has reaction support to effect closing bias on said relief valve.

2. A relief valve having pilot valve control as set forth in claim 1, said pilot valve means having a valve member and a valve port;

said relief valve having a wall;

said port being through said wall and openable and closable by said valve member;

said spring having an end engaging said valve member to close said port and said valve member engaging said wall in closing said port and effecting bias closing force on said relief valve.

3. A relief valve having pilot valve control as set forth in claim 2, said restricted flow means being a bore through said valve member head communicating between said inlet passage and said pressure chamber.

4. A relief valve having pilot valve control as set forth in claim 2, said valve member comprising a piston having siad differential surface areas.

5. A relief valve having pilot valve control as set forth in claim 1, said pilot valve means having a valve head and comprising a piston having an end area disposed to receive inlet pressure force and said piston being engagable with said valve head;

said differential surfaces being said end area of said piston and an area of said valve head exposed to inlet pressure.

6. A relief valve as set forth in claim 5 wherein said end area of said piston is exposed to pressure in said inlet passage and said valve head is exposed to pressure in said pressure chamber, said piston effecting an actuating piston for said valve head.

7. A relief valve having pilot valve control as set forth in claim 6, including a sealing means of flexible material disposed to be flexed by inlet pressure and to engage said actuating piston for actuation thereof and means slidably housing said actuating piston;

whereby said piston is sealed from contact with inlet fluid.

8. A relief valve having pilot valve control as set forth in claim 6, including a filter material disposed to filter inlet passage fluid passing to said restricted flow means.

9. A relief valve having pilot valve control as set forth in claim 1, said relief valve having a wall exposed to inlet pressure in said inlet passage;

actuating means for said pilot valve means comprising an actuating piston slidable carried in said wall and having an end area disposed to receive inlet pressure force and said pilot valve having a valve head actuatable by said actuating piston;

said differential surfaces being said end area of said actuating piston and an area of said pilot valve head disposed to receive inlet pressure force in said pressure chamber;

said restricted flow means being a bore through said wall of said relief valve communicating said inlet passage with said pressure chamber.

10. A relief valve having pilot valve control as set forth in claim 1, said relief valve comprising a tubular member and said spring and pilot valve means being disposed therein;

a cartridge;

said relief valve being slidably carried in said cartridge and said cartridge having means for securement in said housing and having respective ports for exposure to said inlet and outlet passage whereby said cartridge and valves may be inserted and removed from said housing as a unit;

said reaction support means comprising a portion of said cartridge.

11. A relief valve having pilot valve control as set forth in claim 1, said relief valve having a wall facing said inlet passage; said restricted flow means being a bore through said wall of said relief valve.

12. A relief valve having pilot valve control as set forth in claim 1, said reaction support means for said spring comprising an end wall means for said pressure chamber; said spring having an end abutting said end wall means; said pilot valve means having a movable valve member and said spring having an end disposed for biasing said movable valve member to flow closing position, and said movable valve member being disposed to transmit the biasing effected by said spring to said relief valve for biasing said relief valve to flow closing position.

13. A relief valve having pilot valve control as set forth in claim 1, said relief valve comprising a tubular member and said spring and pilot valve means being disposed therein;

a cartridge;

said relief valve being slidably carried in said cartridge and said cartridge having means for securement in said housing and having respective ports for exposure to said inlet and outlet passages;

said reaction support means comprising a portion of said cartridge;

said cartridge having a bore leading to the exterior thereof and communicating with said pressure chamber for connection thereto of a pressure source.

14. A relief valve as set forth in Claim 1, said pilot valve means comprising a port and a coacting valve member movable with respect thereto to vent said pressure chamber.

a piston engagable with said valve member for opening actuation thereof to effect venting;

said piston comprising an end effecting one of said surfaces exposed to inlet pressure;

said valve member comprising the other of said surfaces.

15. A relief valve as set forth in claim 14,
said relief valve having a wall;
said piston being slidably carried therein;
said end of said piston being exposed to pressure in said pressure chamber.

16. A relief valve as set forth in claim 15,
said piston end protruding into said pressure chamber being the smaller of said surfaces;
said valve member comprising the larger of said surfaces.

17. A relief valve as set forth in claim 15,
said wall comprising a chamber into which said piston protrudes and means for feeding inlet pressure into said chamber;
said piston end being the larger of said surfaces;
said wall having said port and said valve member comprising the smaller of said surfaces.

18. A relief valve having pilot valve control as set forth in claim 1,
said pilot valve means comprising a valve head and a tubular valve seat member engaging said valve head;
said valve seat member having said differential surface areas and having a port at one end effecting a valve seat coacting with said valve head;
said valve head being disposed in the interior of said valve seat member;
said spring biasing said valve seat member against said valve head for closure of said port;
valve head support means extending inside said valve seat member and comprising a collar disposed to support the valve head against spring pressure transmitted thereto by said valve seat member;
said collar communicating the interior of said valve seat member with the outlet passage and effecting flow from said pressure chamber to said outlet passage when said valve seat member moves to port opening position away from said valve head;
valve seat member support means on said collar affording sliding support thereon for said valve seat member;
said differential surfaces being effected by a radial exterior area of said valve seat member around said port and a radial area of said valve seat member support means;
both said surfaces being exposed to inlet pressure in said pressure chamber and the valve seat member support means being the larger surface.

19. A relief valve as set forth in claim 18,
wherein said radial area of said valve seat member support means is effected substantially by the surface of a sealing gasket slidably surrounding said collar and sealingly engaging said valve seat member.

20. A relief valve as set forth in claim 18,
wherein said pressure chamber comprises a member having a front opening facing said inlet passage and effecting a conical valve seat for said relief valve; said relief valve having a conical valve head engagable with said valve seat in substantially line contact to establish a predetermined area exposed to inlet passage pressure; said relief valve member having surfaces comprising a cross sectional area exposed to inlet pressure in said pressure chamber substantially equal to said valve head area so as to effect hydraulic balance for said relief valve.

21. A relief valve as set forth in claim 20,
including a gasket surrounding said relief valve member and slidably sealing said relief valve member within said pressure chamber.

22. A relief valve as set forth in claim 18,
wherein said pressure chamber is a tubular member having a front opening facing said inlet passage and effecting a conical valve seat for said relief valve; said relief valve having a conical valve head engageable with said valve seat; said valve head and seat engagement being on an area to diminish the surface of said relief valve member exposed to pressure of said inlet passage operative to effect a closing bias on said relief valve member by virtue of pressure in said pressure chamber.

23. A relief valve as set forth in claim 22,
including a gasket surrounding said relief valve member and slidably sealing said relief valve member within said pressure chamber.

24. A relief valve having pilot valve control comprising:
a housing having an inlet passage and an outlet passage and a pressure chamber;
restricted flow means for providing the inlet pressure of said inlet passage in said pressure chamber;
a relief valve intermediate said passages and disposed in said housing so as to be exposed to inlet pressure opening force from said inlet passage and closing force from said pressure chamber;
a pilot valve means comprising differential area surface means and means whereby said surface means are exposed to the pressure of said passages wherein a surface means exposed to inlet pressure is larger than the other surface means to effect a dominating force in a direction for opening of said relief valve means upon rise in inlet pressure to a predetermined pressure to vent said pressure chamber;
whereby reduction in closing pressure force in said pressure chamber on said relief valve permits opening thereof by inlet passage pressure to communicate pressure flow from said inlet passage to said outlet passage;
spring means in said pressure chamber biasing said valves to closed position.

* * * * *